[11] 3,599,377

[72] Inventor Robert C Brighton,......
[21] Appl. No. 746,350
[22] Filed July 22, 1968
[45] Patented Aug. 17, 1971
[73] Assignee Bausch & Lomb Incorporated Rochester, N.Y.

[54] LENS ALIGNMENT USING GAS BEARINGS
7 Claims, 2 Drawing Figs.

[52] U.S. Cl............................................. 51/284, 51/277, 350/178
[51] Int. Cl............................................. B24b 11/00, B24b 9/14
[50] Field of Search.................................. 51/277, 284; 350/178

References Cited
UNITED STATES PATENTS
| | | | |
|---|---|---|---|
| 2,005,718 | 6/1935 | Desenberg............ | 51/284 |
| 2,437,436 | 3/1948 | Mullen.................. | 51/284 |
| 3,347,088 | 10/1967 | Barnes................... | 73/37.5 |

Primary Examiner—Lester M. Swingle
Attorney—Frank C. Parker

ABSTRACT: Disclosed is a device for aligning a lens element on an axis through the center of curvature of the major lens surfaces. The device is characterized in that spherical fluid bearings are used to position the lens so that it can be clamped for rotation about its geometrical axis.

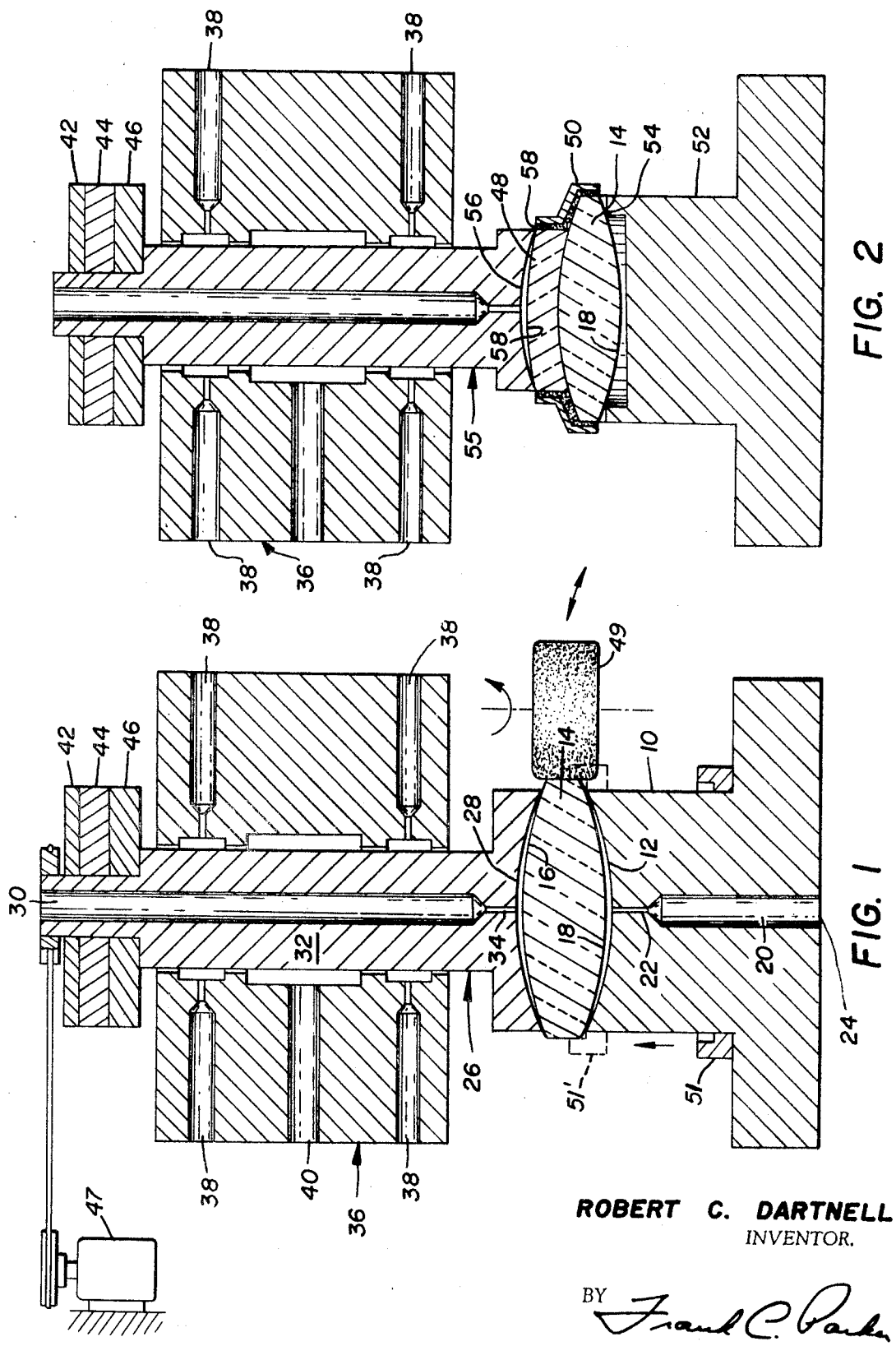

LENS ALIGNMENT USING GAS BEARINGS

BACKGROUND OF THE INVENTION

This invention relates to an improved method and apparatus for aligning a lens for rotation about its geometric axis. Present methods of aligning lenses for mounting a lens mount or for rotation about an axis and preparing the edges for mounting is a tedious job. Assuring the location of a lens with respect to its geometrical axis requires precise instrumentation and a great deal of operator skill.

The burdensome task of aligning a lens with respect to its geometrical axis with known techniques dictates against high production of lens components as subassemblies for such devices as modern data storage and computer devices that require small lens systems as part of their makeup. The normal method of manufacturing is to mount a lens with its geometrical axis parallel to the axis or coincident with the axis of the lens mounting device as a subassembly and thereafter mount the subassembly into the machine using the lens mount as the aligning device. This necessitates precise mounting of the lens in the lens mounting device. If the lens is not mounted precisely, then the mount must be machined or otherwise worked upon to assure the necessary alignment of the axis of the mounting device with the geometrical axis of the lens.

SUMMARY OF THE INVENTION

In order to avoid the above mentioned problems and to more generally provide an improved lens aligning device, I have devised a lens alignment tool wherein spherical fluid bearings are used with a source of constant pressure gas to precisely align the lens according to its geometrical axis. The invention provides for rapid alignment and consequently, rapid mounting of lenses and especially small diameter lenses. It is also possible to align compound lens assemblies with the device of the present invention.

Accordingly, it is the primary object of my invention to provide a device for rapidly aligning a lens according to its geometrical axis.

It is another object of the present invention to provide an improved lens mounting device.

It is still another object of the present invention to provide an improved lens edging device.

It is a further object of the present invention to provide a method for rapidly aligning a lens according to its geometrical axis.

DESCRIPTION OF THE DRAWINGS

FIG. 1 is a cross-sectional view of one embodiment of the present invention.

FIG. 2 is a cross section of a second embodiment according to the present invention.

DESCRIPTION OF THE PREFERRED EMBODIMENTS

Referring to FIG. 1, the number 10 designates a bottom die segment having a spherical lens surface 12. The spherical surface 12 is of a radius slightly smaller than the radius of the lens surface which it will be used to constrain. In other words, there is shown in FIG. 1 a lens 14 with spherical surfaces 16 and 18 and the optic axis of the lens 14 passes through the centers of curvature of surfaces 16 and 18. It will be understood that the refracting surfaces 16 and 18 need not be spherical although it is contemplated that they will be surfaces of revolution about the optic axis of the lens 14. Therefore, radius 12 will be slightly less than the radius of curvature of surface 18 of the lens when surface 18 is spherical. In the case where surface 18 is aspheric it is only necessary that surface 12 have a greater curvature than surface 18. The die 10 has a central gas passage 20 for admitting gas to the space between the lens 14 and surface 12. The configuration of the upper portion 22 of passage 20 will be determined by the particular gas pressures employed. The bottom portion 24 of gas passage 20 shall be fitted with a suitable means for admitting gas at a constant pressure such as a threaded nipple or other such clamping device for receiving a fluid hose. The upper die is designated generally as 26 and has a lower spherical surface 28, a central gas passage 30 and a bearing portion 32. The surface 28 is of a radius of curvature slightly smaller than its corresponding lens surface 16, that is, the curvature of surface 28 is greater than the curvature of lens surface 16. As with bottom die 10, the gas passage 30, in upper die 26, is fitted with the necessary entry end fittings for a gas hose and a lower end portion 34 for constant pressure gas to be admitted to the pocket between the surfaces 28 and 16. The upper die portion 26 is mounted within a hydrostatic bearing shown generally as 36 so it may be raised and lowered for insertion and removal of the lens 14. The hydrostatic bearing contains a plurality of inlet ports 38 for admission of gas and an exit port 40. The configuration of the surfaces around the bearing surface 32 are such that a stiff air bearing assures repetitive vertical displacement of the upper die 26 in a preselected path. There is also provided a series of weights 42, 44 and 46 for placement over the upper die member 26 for causing a breakdown in the fluid films between the dies and the lens.

In operation, the die is set up so that the bottom and top portions are aligned with their geometrical axes in a precise vertical or horizontal position depending upon subsequent operations to be performed on the lens after it is mounted or clamped. The hydrostatic gas bearing 36 assures precise alignment of the upper movable die 26 with the lower die 10. The upper die 26 is then raised and the lens is placed on the lower die 10. The gas is admitted to the conduits 20 and 30 at a predetermined pressure causing a film of gas in the pocket between the surfaces 12 and 18 and surfaces 16 and 28. Thereafter, the upper die 26 is lowered and the lens is allowed to become centered. The centering of the lens will take place because if the lens is offcentered a greater pressure differential will be noted on one side of the gas bearing. This greater pressure will tend to move the lens to its equilibrium position which is that of the geometrical axis of the lens. When the lens is centered, there is a gas film between the lens and the corresponding bearing surface. At this time, sufficient weights 42, 44, 46 can be applied to the upper die 26 to gradually breakdown the gas film and clamp the lens between the die members 10 and 26. At this point, the clamped lens can be rotated by a suitable rotating device generally designated by numeral 47 and the lens can be edged by a suitable grinding procedure generally designated by numeral 49 to assure a smooth uniform edge.

In the event that it becomes necessary or desirous to set the lens into a mount, it would first be necessary to set the mount 51 over the die section 10, as best seen in FIG. 1. After the lens is set between the die 10 and die 26 and thereafter centered, clamped, and edged, the lens mount 51 is brought up, shown here as 51' to surround the lens 14. A suitable cement is then applied to affix the lens to the mount. When mounting the lens it would, perhaps, be advisable to use an inert gas, such as nitrogen, for the gas bearings. The use of inert gas will prevent oxidation of the cement and, also, to assure that the lens will be oxygen free at its periphery so that the cement may easily adhere thereto. It is, of course, understood that the drawing is only a graphic showing of this procedure. The grinding device will be swung out of the way before the lens mount will be brought up to surround the lens. The lens mount is also shown in the two positions it assumes. The solid line showing where the lens rest waiting to be brought up and, the dotted line showing the position the mount is in just prior to cementing.

Shown in FIG. 2 is a similar device whereby a second lens 48 can be mounted on the first lens 14 which has already been aligned with and mounted in a lens holding device 50. In this embodiment, the bottom die 52 can be of exactly the same radius of curvature as the lens surface 18 because the first lens 14 has already been aligned to the mounting device. However, I have found that if the lens is supported on knife edge 54 centering is made easier and problems of the wear and curve generation in the die are eliminated. The upper die 55 contains a radius of curvature 56 slightly smaller than that of surface 58 of lens 48. Mounting of lens 48 can be accomplished then by placing the lens 14 on the bottom die 52, fitting lens 48 within the mounting ring 50 and thereafter lowering the top die 55 and as before allowing the lens to seek to equilibrium position thereby aligning it with bottom lens 14. At this point, the necessary cement 58 can be added to fix the lens in the required position.

Referring back to the embodiment shown in FIG. 1, it is preferable to keep the lens floating during the operation when it is cemented into a lens mount. The air cushion is stiff enough to prevent movement and there is no contact by the dies with the polished surfaces. In addition, a second lens can be positioned using the apparatus of FIG. 1 by coating the upper lens surface 16 with a photocement and then adding the second lens element and using the gas cushion to position the second lens after the first lens is cemented in place. The second lens is then fixed by exposing the cement to ultraviolet light.

It may also be possible to replace weights 42, 44, 46 with a positive pressure device such as an air bellows, and actuated cylinder or the like.

While I have described my invention by what I consider the preferred embodiment, I wish it understood that the invention is limited only by the scope of the appended claims.

I claim:

1. A device for positioning a lens element having an optic axis and having opposed faces, each of which comprises a surface of revolution about the optic axis of the lens element, such that the optic axis of the lens element is aligned with a geometrical axis of the device, said device comprising:
   a first fixed die for constraining one surface of said lens element and having a curvature greater than the curvature of the lens element surface which it constrains;
   a second die slidably mounted in axial alignment with said first die on the geometrical axis of the device for constraining the other surface of the lens element and having a curvature greater than the curvature of the lens element surface which it constrains; and
   means for producing a fluid film between each of said dies and the lens element being aligned.

2. A device according to claim 1, wherein the second spherical die is axially aligned by a hydrostatic bearing.

3. A device according to claim 2, wherein the second die includes means to cause a breakdown of the fluid film between said dies and the lens element positioned therebetween.

4. A lens aligning device comprising:
   a first die fixably mounted for constraining a first refracting surface of a lens having opposed curved refracting surfaces;
   a second die, having a spherical surface, slidably mounted in axial alignment with said first die for constraining the other refracting surface of said lens and having a curvature greater than the curvature of the lens refracting surface which it constrains; and
   means for producing a fluid film between said second die and the lens.

5. A device according to claim 4, wherein the second die is axially aligned by a hydrostatic bearing.

6. A device according to claim 5, wherein the second die includes means to cause a breakdown of the fluid film.

7. A method for edging a lens defining two curved optic surfaces each having a common optic axis, comprising the steps of:
   placing the lens between two gas bearing surfaces so as to dispose each optic surface of the lens respectively opposite one of the two gas bearing surfaces, each of said bearing surfaces having a greater curvature than the curvature of the lens surface which it faces;
   centering the lens between the two gas bearing surfaces;
   securing the lens by applying clamping means thereto at a point sufficiently removed from the edge of the lens to permit treatment thereof, the application of the clamping means gradually bringing the two gas bearing surfaces into engagement with the lens; and
   thereafter rotating the lens about its axis for edging.